Patented Sept. 27, 1938

2,131,258

UNITED STATES PATENT OFFICE 2,131,258

IODO-PHENYLPHENOLS

Wesley C. Stoesser, Midland, Mich., assignor to The Dow Chemical Company, Midland, Mich., a corporation of Michigan No Drawing. Application March 7, 1936,
Serial No. 67,683

2 Claims. (Cl. 260—620)

This invention concerns iodinated ortho-phenylphenol compounds and, more particularly, mono-iodo-ortho-phenylphenol. I have prepared this new compound, determined certain physical and chemical properties thereof whereby it may readily be identified, and found it to be useful as a microbicide, antiseptic, etc.

In preparing mono-iodo-ortho-phenylphenol, approximately equimolecular portions of ortho-phenylphenol and iodine may be dissolved in an organic solvent, e. g. carbon tetrachloride, toluene, xylene, etc. Sodium hydroxide in solid form or aqueous solution is then slowly added to the rapidly agitated reaction mixture, the temperature being regulated so as not to exceed approximately 60° C., although somewhat higher temperatures can be employed. Following addition of the sodium hydroxide, stirring and heating is continued for a sufficient time to insure complete reaction and the iodinated ortho-phenylphenol product separated therefrom, e. g. by fractional distillation.

Another way in which the compound may be prepared is by diazotization of 4-amino-6-phenylphenol and decomposition of the resulting product with potassium iodide.

The following example describes in detail one method of preparing iodo-ortho-phenylphenol.

17 grams (0.1 mol) of ortho-phenylphenol and 25.4 grams (0.1 mol) of iodine crystals were dissolved in 50 milliliters of carbon tetrachloride. 8 grams (0.05 mol) of finely divided anhydrous sodium hydroxide was added to this solution with agitation and the temperature maintained between 40° and 60° for a period of approximately two hours, after which the reaction mixture was extracted with a dilute aqueous solution of sodium hydroxide to dissolve out the phenolic constituents. 28.6 grams of a crude iodo-phenylphenol product was recovered as a dark viscous liquid by acidification of this phenolate solution with sulphuric acid. This crude reaction product was washed several times with warm water and fractionally distilled under reduced pressure to recover 7.7 grams (0.045 mol) of unreacted ortho-phenylphenol, 15.5 grams (0.052 mol) of an oily mixture of isomeric mono-iodo-ortho-phenylphenol products, and 5.4 grams of a compound boiling between 250° and 260° C. at 15 millimeters pressure, which was apparently the di-iodo-derivative.

The major portion of the mono-iodo-ortho-phenylphenol fraction solidified on standing and was separated from a small amount of uncrystallized oil by filtration. The resultant crystalline mass was washed with petroleum spirit and recrystallized several times from petroleum ether to yield a pure mono-iodo-ortho-phenylphenol compound as a white crystalline solid having a melting point of 35.2° C., a boiling point of 200°–205° C. at 15 millimeters of mercury pressure absolute, a specific gravity of 1.666 at 20°/4° C., and probably the formula

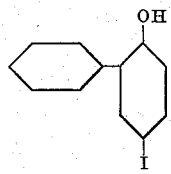

Analysis of this compound showed 42.7 per cent iodine present, which corresponds closely to the theoretical percentage of 42.9. The compound is substantially insoluble in water, but soluble in aqueous alkalines and most organic solvents.

The mixed reaction products resulting from the above iodination may be utilized as antiseptics, etc., without separating therefrom the individual constituents. Such compositions are viscous high boiling liquids comprising, as a major constituent, a mixture of the 2- and 4-mono-iodo-ortho-phenylphenols in admixture with small amounts of unreacted orthophenylphenol and 2,4-di-iodo-ortho-phenylphenol.

Other modes of applying the principle of my invention may be employed instead of those explained, change being made as regards the method or compounds herein disclosed, provided the compounds stated by any of the following claims be obtained.

I therefore particularly point out and distinctly claim as my invention:

1. A mono-iodo-ortho-phenylphenol wherein the substituting iodo- group is attached to the hydroxyl-substituted benzene ring.

2. Mono-iodo-ortho-phenylphenol, a crystalline compound having a melting point of approximately 35.2° C., a boiling point of 200°–205° C., at 15 millimeters pressure, a specific gravity of 1.666 at 20°/4° C., and the formula

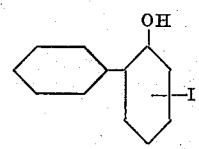

WESLEY C. STOESSER.